(No Model.)

J. B. MEADLEY.
CAR BRAKE.

No. 480,503. Patented Aug. 9, 1892.

Witnesses:
P. A. Murphy
L. G. Sushmeld

Inventor.
Jabez B Meadley
per Wm K. White
Attorney.

UNITED STATES PATENT OFFICE.

JABEZ B. MEADLEY, OF DAVENPORT, IOWA.

CAR-BRAKE.

SPECIFICATION forming part of Letters Patent No. 480,503, dated August 9, 1892.

Application filed August 29, 1891. Serial No. 404,171. (No model.)

*To all whom it may concern:*

Be it known that I, JABEZ B. MEADLEY, a citizen of the United States, residing at Davenport, in the county of Scott and State of Iowa, have invented a new and useful Device for Applying Brakes to the Wheels of Cars, of which the following is a specification.

My invention relates to applying shoe-brakes against the rim of a car-wheel to cause sufficient friction to stop its rotation; and the object of my invention is to provide means for exerting power against brake-shoes on opposite sides of a wheel or on opposite sides of wheels in a car-truck in a direction or line which is the central point between such brake-shoes, and I accomplish this object by the mechanism illustrated in the accompanying drawings, in which—

Figure 1:
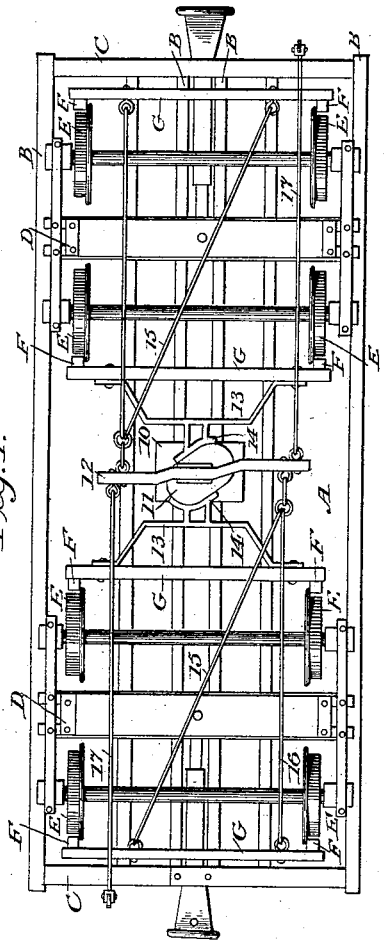
Figure 2:
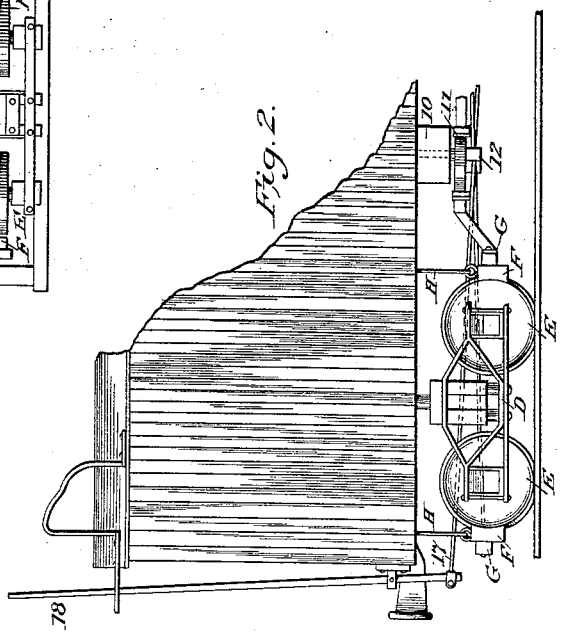

Figure 1 shows a view of the bottom of a car inverted with my device attached to the brake-shoes, and Fig. 2 shows the elevation of one end of the car with my device attached.

Similar letters and figures refer to similar parts throughout the several views.

A represents the floor of a car; B, longitudinal sills; C, cross-sills; D, car-trucks, and E the wheels of such trucks.

F are shoe-brakes. G are cross-beams connecting such shoe-brakes, which are suspended from the car-floor by the links H, which may be hinged to such shoe-brakes or to the cross-beams G.

At about the center of the car-frame I attach to the longitudinal sill B a bed-plate 10, and to which bed-plate I pivot the cam 11, which cam carries a lever 12, which is practically a cross-beam. From the cross-beam G, connecting the brake-shoes, I attach a frame 13, which carries a circular strap 14, which operates against the cam 11. From one end of the lever or cross-beam 12 I connect rods 15 and 16, the opposite ends of which connect with the cross-beams G, connecting the shoe-brakes, and to the opposite end of the lever or cross-beam 12 I attach a rod or chain 17, which may be drawn forward or released by a lever 18, or if a chain or strap is used the same may be attached to a vertical rod, upon which the same may be wound by means of a hand-wheel upon such rod, and such rod held stationary by a ratchet-wheel upon such rod, held by a detent attached to the car, or any other equivalent means may be used for rotating the cam.

It will be seen that by rotating the cam partially it will force the frame 13 and cross-beam G, carrying the brake-shoes, against the rim of the wheel, while the rods 15 and 16 will draw upon the opposite cross-beam G, pressing its brake-shoes, also, against the rim of the wheels and by the friction thus caused step the rotation of the wheels.

From the description here given persons skilled in the art will readily understand the construction and operation of my device.

What I claim as new, and desire to secure by Letters Patent, is—

In a device for applying brakes to the wheels of cars, in combination with the wheels and hanging horizontal cross-beams carrying brake-shoes in line with the rims of the wheels, the pivoted cam, the lever attached thereto, the frame carrying the circular straps to be operated against by the cam and connected with a horizontal cross-beam carrying brake-shoes, the rods connected with one end of the lever attached to the cam, the other end attached to the opposite horizontal cross-beam carrying brake-shoes, and means for rotating such cam, substantially as described.

JABEZ B. MEADLEY.

Witnesses:
W. W. HUMPHREY,
MARY MCGUIRK.